(12) United States Patent
Chouhan

(10) Patent No.: US 9,916,137 B2
(45) Date of Patent: Mar. 13, 2018

(54) REST SERVICE SOURCE CODE GENERATION

(71) Applicant: Oracle International Corporation, Redwood Shores, CA (US)

(72) Inventor: Nirdosh Chouhan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/315,248

(22) Filed: Jun. 25, 2014

(65) Prior Publication Data
US 2015/0378691 A1 Dec. 31, 2015

(51) Int. Cl.
*G06F 9/44* (2006.01)
*H04L 29/08* (2006.01)
*G06F 9/54* (2006.01)

(52) U.S. Cl.
CPC ............... *G06F 8/31* (2013.01); *G06F 8/30* (2013.01); *G06F 9/547* (2013.01); *H04L 67/02* (2013.01)

(58) Field of Classification Search
CPC ... G06F 8/31; G06F 8/30; G06F 9/547; H04L 67/02
USPC ........................................................ 717/106
See application file for complete search history.

(56) References Cited

U.S. PATENT DOCUMENTS 9,052,914 B2 * 6/2015 Kieffer
2014/0372970 A1 * 12/2014 Broussard et al. ........... 717/106

OTHER PUBLICATIONS

Jonathan M. Hollander; "Data-driven API Creation and Processing in Node.js"; 7 pages; Jul. 26, 2013.
Jiang, Lihong—"An IoT-Oriented Data Storage Framework in Cloud Computing Platform" IEEE Transactions on Industrial Informatics, vol. 10, No. 2, May 2014; 9 pages.
Peng, Yu-Yen, et al. "REST2SOAP: a Framework to Integrate SOAP Services and RESTful Services" IEEE Internation Conference; Jan. 14, 2009; 4 pages.
Liu, Peter—"Building RESTful Web Services in NetBeans 6.0 https://netbeans.org/download/magazine/04/nbmag4-restfulws.pdf" Dec. 2007; 8 pages Retrieved from the internet, https://netbeans.org/community/magazine (the whole document provides proof of the publication date).
Sun Microsystems: "RESTful Web Services Developer's Guide" https://docs.oracle.com/cd/E19776-01/820-4867/820-4867.pdf; Apr. 2009; 43 pages.

* cited by examiner

Primary Examiner — Anna Deng
(74) Attorney, Agent, or Firm — Trellis IP Law Group, PC

(57) ABSTRACT

A system and method for facilitating development of a web service, such as a Representational State Transfer (REST) web service. The example method includes determining one or more characteristics of a service interface and incorporating the resulting information in a file; and automatically generating computer code to implement a REST service based on the file. In a more specific embodiment, the file is an XML file, which may be output from a REST analysis tool applied to the service interface. The web service may leverage or include one or more resources that have been mapped to a REST service via a code generator used to implement the generating step.

18 Claims, 4 Drawing Sheets

REST SERVICE SOURCE CODE GENERATION

CROSS REFERENCES TO RELATED APPLICATIONS

This application is related to the following application, U.S. patent application Ser. No. 13/474,709, entitled METHOD FOR REWRITING DYNAMICALLY GENERATED UNIFORM RESOURCE LOCATORS IN PROXIED HYPER TEXT MARKUP LANGUAGE CONTENT, filed on May 17, 2012, which is hereby incorporated by reference, as if set forth in full in this specification.

BACKGROUND

The present application relates to software and more specifically to systems and methods for facilitating developing and implementing remotely accessible software, such as web services.

Remotely accessible software is employed in various demanding applications, including enterprise cloud-based software accessible to distributed clients, such as mobile devices. In many enterprise computing environments, different software systems must exchange data, such as via web services or via other mechanisms for communicating data between software systems via the Internet. A software system that requests data is called a service requester, and a software system that processes the request and provides data is called the service provider.

Software development methods and tools for facilitating developing web services, Application Programming Interfaces (APIs), and so on, used to implement such remotely accessible software, often demand efficient mechanisms that enable rapid development and installation of computer code.

Conventionally, development of a web service, such as a Representational State Transfer (REST) service, requires analysis of service interface details, i.e., details of the communications interface between a client device and a remote content server. Such analysis is often performed manually, i.e., hand coded via software development tools. However, manual approaches, which may involve opening interface objects and files; visually checking and editing service components as needed; and editing service code accordingly, can be excessively time consuming and error prone.

Generally, development of REST services via API interfaces using existing tools can be excessively labor intensive, costly, and error prone.

SUMMARY

An example method facilitates development of a web service, such as a Representational State Transfer (REST) web service. The example method includes determining one or more characteristics of a service interface, such as a uniform service interface for REST services; receiving a file with information associated with the determining; and automatically generating computer code to implement a REST service based on the file.

In a more specific embodiment, the characterization of the service interface includes information maintained in an XML file. The XML file may represent an output of a REST analysis tool applied to the service interface. The web service may leverage or include one or more resources that have been mapped to a REST service via the step of automatically generating.

A code generator may be employed to automatically generate the computer code comprising the REST service. The code generator is adapted to create a dump file that contains one or more programming language classes that comprise the generated computer code. A name annotations modifier facilitates processing classes specified in a package received by the code generator. Each method of each class of the package is processed to produce one or more updated methods in response thereto, which have been updated in accordance with service interface details, i.e., information.

In the specific embodiment, the one or more programming language classes are adapted to be deployed on a Java® platform via a REST container, such as a Jersey REST container. The output dump file includes computer code for all generated Java REST resource files. The code generator employs computer code maintained via a Java archive.

The example method may further include receiving a command to trigger running of the computer code, i.e., the code generator. The command may be a GET HyperText Transfer Protocol (HTTP) method, a POST HTTP method, or other method. The code generator is adapted to automatically import all service dependencies for incorporation into the dump file.

Hence, certain embodiments discussed herein provide systematic guidance to developers to facilitate writing REST services and further provides a code generation tool for quickly generating REST services or converting other types of web services to REST services. While certain specific embodiments are particularly adapted for generating Jersey REST services, similar methods can be extended to other platforms, such as platforms employing Apache CXF or RestEasy.

By enabling automatic code generation for REST services, including generating overhead code for converting existing web services to REST services, development costs and human error may be reduced.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on intranet web servers, databases, files on local hard discs or file servers, email systems, document management systems, portals, and so on.

For the purposes of the present discussion, a web resource may be anything that can be named and addressed via a computer network, including computing language classes (e.g., Java classes), objects, web services, and so on. In general, anything that is referenced via a Uniform Resource Identifier (URI) or web address, such as a URL, can be considered a web resource. A URI may be may be any string of characters specifying a network address.

Enterprise software may be any set of computer code that is adapted to facilitate implementing any enterprise-related process or operation, such as managing enterprise resources, managing customer relations, and so on. The terms "enterprise software" and "enterprise application" may be employed interchangeably herein. However, an enterprise application may include one or more enterprise software modules or components, such as user interface (UI) software modules or components.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, Internet Service Providers (ISPs), class loaders, bytecode compliers, and so on, have been omitted from the figures. However, those skilled in the art with access to the present teachings will know which components to implement and how to implement them to meet the needs of a given implementation.

Figure 1:
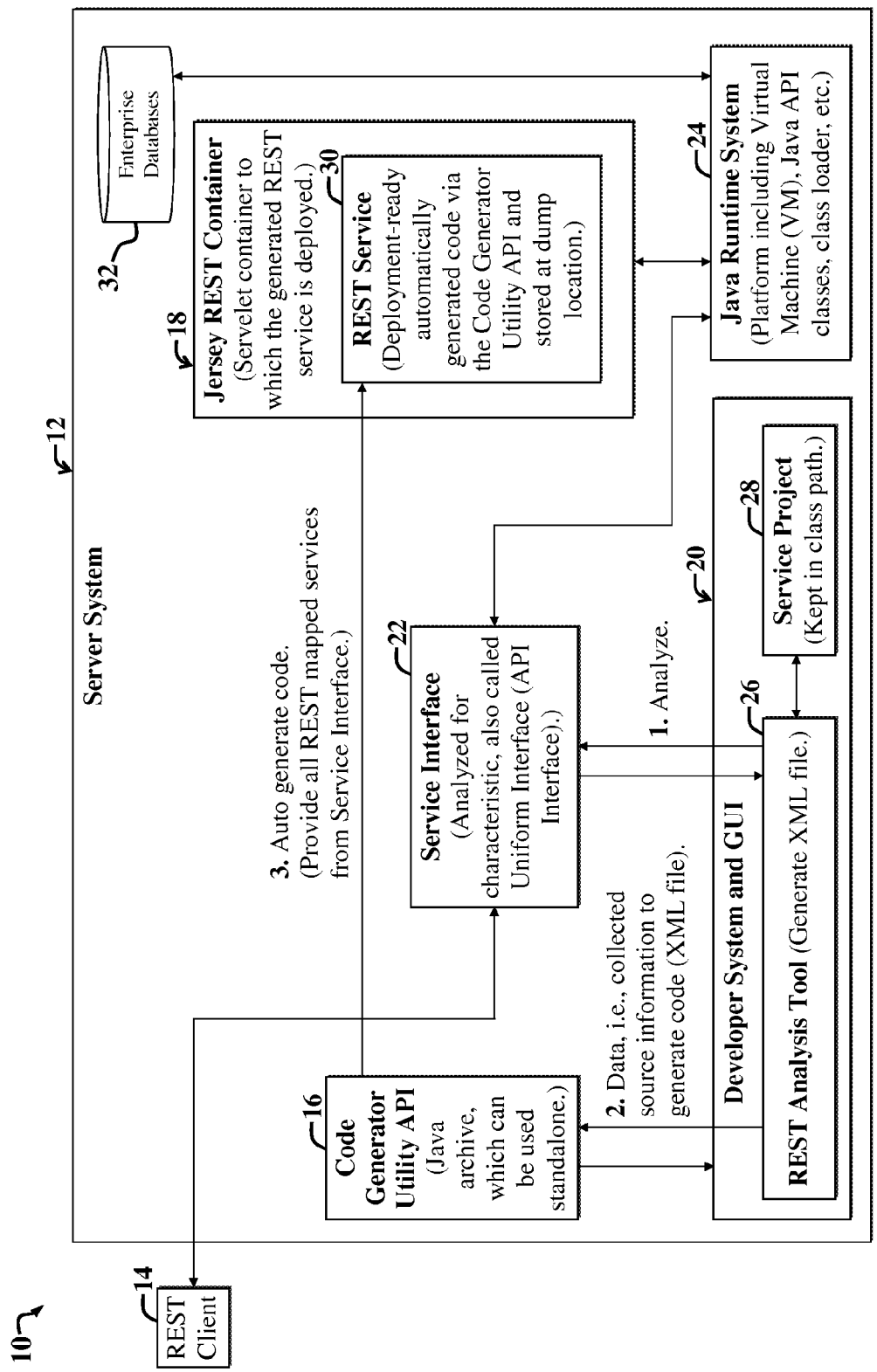
FIG. 1 is a diagram illustrating a first example system enabling automatic generation of REpresentational State Transfer (REST) services.

FIG. 1 is a diagram illustrating a first example system 10 enabling automatic generation of REpresentational State Transfer (REST) services. In the present example embodiment, the system 10 is adapted to facilitate conversion of a web service of a service project 28 to a REST service 30 via a code generator utility Application Programming Interface (API) 16 (also simply called code generator), with reference to a service interface 22.

Note that various modules of the system 10 may be grouped, arranged, coupled, and/or distributed differently than shown, without departing from the scope of the present teachings. For example, in an alternative grouping, the code generator 16 may be considered part of the developer system 20, and the Jersey REST container 18 and accompanying service 30 may be considered part of the Java runtime system or platform 24. Similarly, in certain implementations, interconnections between modules may be different than those shown.

The first example system 10 includes a REST client 14 in communication with one or more enterprise databases 32 via one or more services, such as the REST service 30. The REST service 30 includes deployment-ready code, which may be run via a Java runtime system 24, and which is adapted to facilitate access to data maintained via the enterprise databases 32 in accordance with the service interface 22.

For the purposes of the present discussion, a REST client may be any client that operates in or communicates with a system that supports REST services. Similarly, a REST server may be any server that is adapted for use with a REST architectural style or for use with REST services. A client may be any computer, system, or network resource that is adapted to receive content from another computer or system, called a server. A server system may be any collection of one or more servers.

An example developer system and Graphical User Interface (GUI) 20 (also simply called the developer system) communicates with the code generator utility API 16 and the service interface 22. The developer system 20 includes a REST analysis tool 26, which includes computer code that is adapted to facilitate analysis of the service interface 22 and generate an eXtensible Markup Language (XML) file containing results of the analysis.

The REST analysis tool 26 further communicates with a service project 28 and the code generator 16. The code generator 16 receives the XML file with analysis results of the service interface 22 and may further receive service project information pertaining to the service project 28, including class files characterizing a web service that is to be converted to the REST service 30. The code generator 16 receives the XML file from the developer system 20 and then runs a process to automatically generate the REST service 30 based on the input received from the developer system 20.

The service project 28 may include computer code for a service that has not yet been configured to operate as a REST service. This computer code may represent part of a package that is delivered to or accessible to the code generator API 16 for use in generating the REST service 30 in accordance with an analysis of the service interface 22.

The code generator 16 is adapted to generate the REST service 30, such that the service has access to all (i.e., may call) requisite REST mapped services available via the service interface 22. The code generator 16 may be implemented as a Java archive.

The REST service 30 is stored via a Jersey REST container 18, and it represents a dump location for programming language classes that comprise the REST service 30. For the purposes of the present discussion, a programming language class may be any computing object employed as a part of software code and which may encapsulate data and/or functionality, e.g., attributes and/or methods.

In the present example embodiment, the REST service 30 represents a RESTful web service implemented in accordance with the Jersey RESTful Web Services framework. The Jersey RESTful Web Services framework is an open source framework facilitating implementation of web services in Java in accordance with JAX-RS (Java API for RESTful Web Services) APIs, consistent with Java Specification Requests (JSRs) 311 and 339. A Jersey implementation of intercommunicating web resources provides a library that facilitates implementing RESTful web services in Java servlet containers, such as the container 18.

The Java runtime system 24, which may include a Java Virtual Machine (JVM) and associated platform, including Java APIs, class loaders, profilers, and so on, is adapted to selectively execute, interpret, or both (e.g., via a Just-In-Time (JIT) compiler), computer code of the REST service 30. The REST client 14 may include a browser, APIs, and other client side software that is adapted to call, invoke, or otherwise use the REST service 30 to call an application that employs the REST service 30.

For example, the REST client 14 may request data and/or functionality provided via the enterprise databases 32 via the REST service 30 and accompanying Java runtime system 24. The REST client 14, i.e., requestor, may send a request message via the service interface 22 to the server system 12, i.e., the provider. The request message may be addressed to the REST service 30 running via the Java runtime system 24. The running REST service 30 then retrieves data from the enterprise databases 32 in accordance with the request and facilitates employing the service interface 22 to deliver results of the data retrieval to the REST client 14.

In summary, the code generator utility API 16 facilitates automatic creation of REST services. Each service interface 22 is analyzed for its characteristics, and then resulting analysis data is supplied to the code generator 16 to facilitate automatic generation of the REST service 30. Automatic generation of REST service computer code based on service interface details, as discussed herein, may substantially reduce development time and errors needed to develop and deploy the REST service 30.

A developer employing the developer system 20 may manually create an XML file characterizing the service interface 22 and/or employ the REST analysis tool 26. An example XML file is discussed more fully below.

While developing a web service, the service project 28 is kept in the class path specified in the XML file, for use by the code generator API 16 and accompanying Java runtime system 24. A developer may employ the developer system 20 to call or activate the code generator 16, such as via a GET and/or POST HyperText Transfer Protocol (HTTP) method.

A dump location specified in the method call (corresponding to the location of the REST service 30), will have all java REST resource files generated and ready for use. All service dependencies, e.g., dependencies of the REST service 30 on other services, are automatically imported into the REST service 30 or otherwise accounted for to enable the REST service 30 to function properly.

Note that generally, web services, such as the REST service 30, may be called or used by different web applications, including server-side and client-side applications. For example, an API of the REST client 14 may be employed by the REST client 14 to request services from the server system 12. The server system 12 may include other web applications that may interface with the REST client 14, without departing from the scope of the present teachings.

For the purposes of the present discussion, a web application may be any computer code, e.g., a software application, that is adapted to be accessed by one or more client devices over a network, such as the Internet or an intranet. A web application may call and/or implement one or more web services.

A web service may be any software function or operation activated or implemented via software running on a server in response to a signal, e.g., a request message, sent from a client to the server via a network, such as the World Wide Web. The software that implements a web service operation may also be called a web service, software service, or simply service herein.

Generally, web applications may be implemented via various methods and accompanying mechanisms, such as Java, JavaScript, Flash, Silverlight, and so on. Furthermore, certain web applications may be defined by a process template that executes several processes, where each process is implemented via a separate web service.

Generally, software services provide functionality, e.g., capabilities, that may be reused by different applications or processes (that may be distributed across a network), which access the functionality via a predetermined interface, e.g., as specified via middleware, and consistent with a service description.

Web services that adhere to REST architectural style are called RESTful web services. The REST architectural style specifies constraints for web services, including compatibility with a uniform interface that may be adapted to facilitate scalability, modifiability, reusability, and so on.

The REST architectural style, calls for a client-server architecture, where data and functionality are considered resources. These resources are accessed using Uniform Resource Identifiers (URIs), which may correspond to links in a webpage. The resources are acted upon using well-defined operations (e.g., GET, POST, etc.) and a communications protocol, such as HTTP. Hence, clients and servers exchange representations of resources using a standardized interface and protocol.

The service interface 22 represents a uniform interface for REST communications between network resources, including the REST client 14 and server system 12. For the purposes of the present discussion, a service interface may be any mechanism that facilitates intercommunications between network resources that include web services. A service interface is often adapted to implement and enforce a contract between an exposed service and software applications and/or other services communicating with the service.

In a REST system, e.g., the system 10, a request from a client, i.e., requestor for a service, contains information used to service the request. The session state characterizing a communications interaction between a requestor and a provider, e.g., a client and a server, may be stored at the client. However, the session state can be transferred to another service by the server, e.g., the server system 12.

The client, e.g., REST client 14, issues requests to the server system 12 to transition to a new state. The representation of each application state may include links (URIs) for subsequent client state transitions. The service interface 22 facilitates decoupling of applications, services, and so on, thereby enabling potentially disparate applications and systems to intercommunicate and interoperate.

Figure 2:
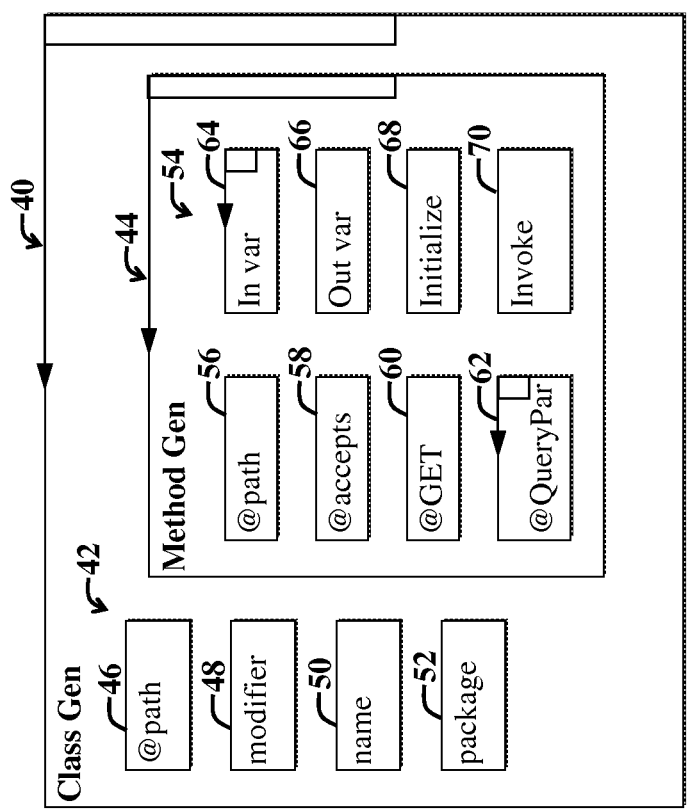
FIG. 2 is a block diagram of an example class characterizing the code generator of FIG. 1.

FIG. 2 is a block diagram of an example class structure 40 characterizing the code generator of FIG. 1. Classes built for REST web services via the code generator 16 of FIG. 1 will generally be consistent with the class 40. However, those skilled in the art will appreciate that details of a particular class may vary and may have different numbers and types of attributes, including method attributes.

The class 40 includes class attributes data 42 and method attributes or components 54 of a method section 44 supported by the computing environment (which may include various libraries, protocol specifications, and so on).

The class data 42 (i.e., attributes) includes an identification of a path (@path) 46, a modifier 48, a service name 50, and a reference to a package 52. Methods components of the method section 44 include attributes characterizing a path method 56 (@path), an accepts method 58 (@accepts), a GET method 60 (@GET), a query parameter method 62 (@QueryParam), an input variable method 64, an output variable method 66, an initialize method 68, and an invoke method 70.

With reference to FIGS. 1 and 2, the method attributes 64 and general class attributes 42 of the code generator class 40 are adapted to be employed by the code generator 16 of FIG.

1 to process a package received from the developer system 20 (including classes of a web service that is to be converted into the REST service 30, and which is part of the service project 28) to facilitate generating the REST service 30.

Figure 3:
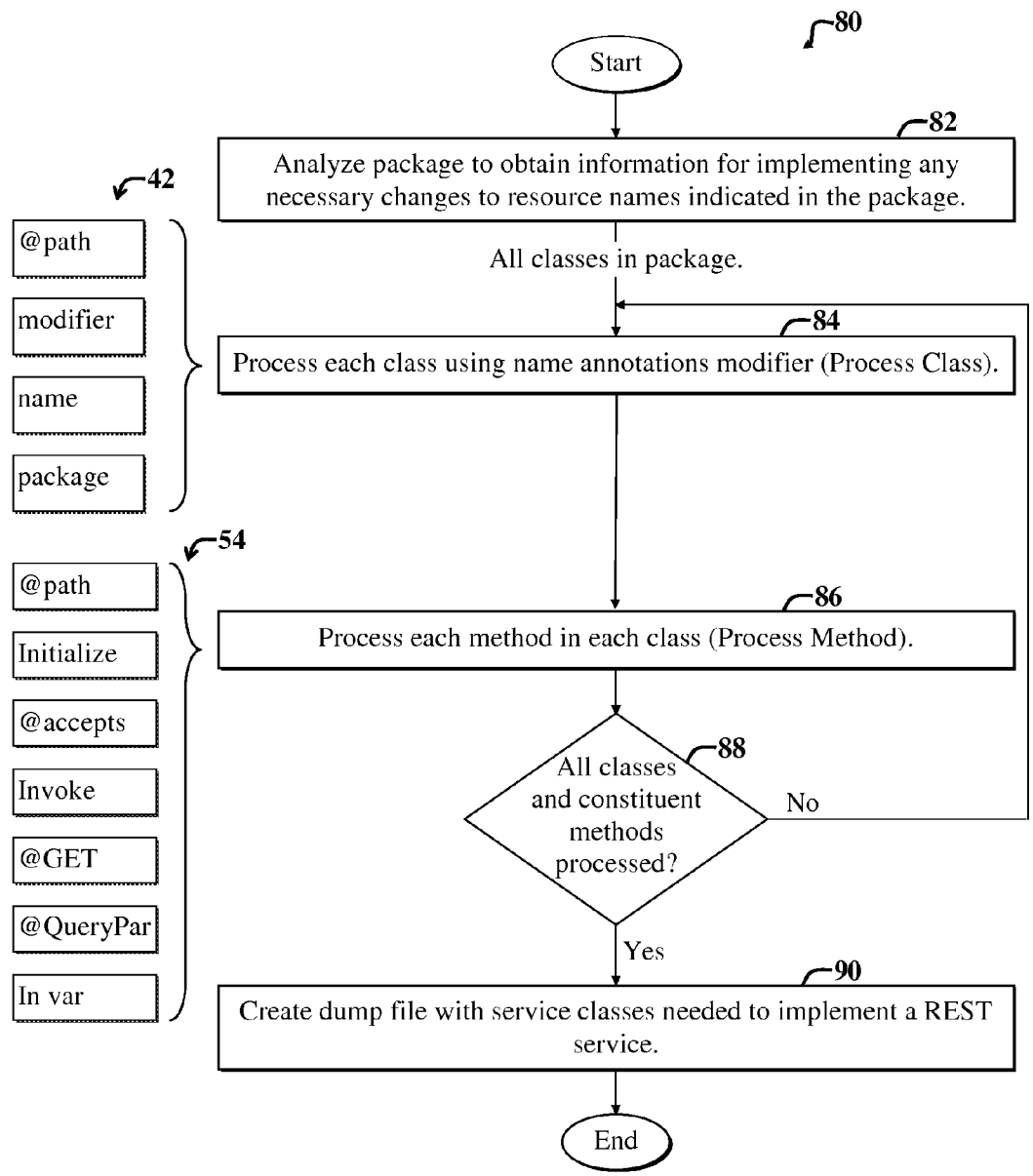
FIG. 3 is a flow diagram of an example process implemented via the code generator of FIG. 1 and adapted to process a package provided via an eXtensible Markup Language (XML) and characterizing the service interface.

FIG. 3 is a flow diagram showing an example process 80 implemented via the code generator of FIG. 1 and which is adapted to process a package provided via an XML file characterizing the service interface 22 of FIG. 1.

The example method 80 includes an initial analysis step 82, which involves analyzing a package (including an XML file received by the code generator 16 via the developer system 20 of FIG. 1) to obtain information for implementing requisite changes to resource names indicated in the package.

Subsequently, classes in the package are passed to a name processing step 84. The name processing step 84 includes processing each class using a name annotations modifier, with reference to class attributes 42 as shown included in the code generator class 40 of FIG. 2.

Next, a method processing step 86 selectively processes methods 54, as shown included in the code generator class 40 of FIG. 2, for each class in the package. The processing of class attributes 42 and accompanying method attributes 54 may involve mappings in accordance with mapping logic, as discussed more fully below.

A checking step 88 subsequently checks to confirm whether or not all classes in the package have undergone name processing 84 and method processing 86. If so, a dump-file creation step 90 is performed. Otherwise, control returns to the name processing step 84 and method processing step 86 until all classes in the package are fully processed.

The dump-file creation step 90 includes automatically creating a dump file with all processed service classes needed to implement the REST service 30 of FIG. 1.

With reference to FIGS. 1-3, analysis of the service interface 22 produces information, including class attributes, such as name, modifier type, annotations, and so on, and further including method data, such as method name, input arguments, and return type.

An example service interface specification, which may be analyzed by the developer system 20 of FIG. 1 to produce an XML file to be fed to the code generator 16 is illustrated via the following pseudo code:

```
public class DataServerService
{
    private DataServerService( )
    {
    }
    public static DataServerInfo[ ]
    getAllDataServerInfos(OdiInstance odiinstance)
    {
        List<DataServerInfo> dataServerInfos = new
        ArrayList<DataServerInfo>( );
        List<OdiDataServer> odiDataServers =
        oracle.odi.repex.model.domain.topology.DataServerService.
        findAll(odiinstance);
        if (odiDataServers != null && !odiDataServers.isEmpty( ))
        {
            for (OdiDataServer odiDataServer : odiDataServers)
            {
                DataServerInfo dataServerInfo =
                getDataServerInfo(odiDataServer);
                if ( dataServerInfo != null )
                {
                    dataServerInfos.add(dataServerInfo);
                }
            }
        }
```

```
        return dataServerInfos.toArray(new
        DataServerInfo[dataServerInfos.size( )]);
}
```

An example portion of an XML file resulting from analysis of the service interface 22 is as follows:

```
<clss>
    <cls_name>oracle.odi.em.service.DataServerService</cls_name>
    <mthds>
        <in xsi:type="xs:string"
        xmlns:xs="http://www.w3.org/2001/XMLSchema"
        xmlns:xsi="http://www.w3.org/2001/XMLSchema-
        instance">oracle.wtg.core.OdiInstance</in>
        <mthd_name>getAllDataServerInfos</mthd_name>
        <out xsi:type="xs:string"
        xmlns:xs="http://www.w3.org/2001/XMLSchema"
        xmlns:xsi="http://www.w3.org/2001/XMLSchema-
        instance">[Loracle.wtg.em.info.DataServerInfo;</out>
        <out_collection>true</out_collection>
    </mthds>
```

Example mapping metrics used by the code generator 16 to map attributes of the service interface 22 to attributes of the REST service 30 are provided in the following table.

TABLE 1

| Rest Service - Attribute | Service Interface - Attribute | Comment - Mapping logic |
|---|---|---|
| Package | Service package | Alter service package to resource package which will hold all generated REST Java source code |
| Class name | Class Name | Name should suffix Resource and remove Service |
| Class Modifier | Class modifier | Should be public |
| Class @Path annotation | classname | Remove any assessors such as service resource and have literal name in lower case |
| Method Modifier | Method Modifier | |
| Method Name | Method Name | |
| Method Arguments and Type | Method in params | Arguments needs to be converted to Java object or literal type Int, void, float com.sample.code.Customer Based on method param names create @QueryParams annotations |
| Method @Path | | |
| Method @GET/POST Method @Path | | Based on GET/POST change @QueryParam annotation Create the path value with lower case method name by removing char sequence such as 'get' 'find' |
| Invoke the Service interface | Class name. Method Name | |
| Arguments for invoke | | Arguments created while creating method signature to be used |
| Out Value var creation and Type | Method OutParams Type | Return variable to be initialized and assigned to return value of Service invoke If void no need to initialize the var |

TABLE 1-continued

| Rest Service - Attribute | Service Interface - Attribute | Comment - Mapping logic |
| --- | --- | --- |
| Pass variable to invoke Return the out Value Repeat the process for all methods Generate file in package directory | inparams | Variable created during method signature it should variable names |

Example pseudo code for a portion of output of the code generator 16 is as follows:

```
package oracle.odi.em.resource;
import javax.ws.rs.GET;
import javax.ws.rs.Path;
import javax.ws.rs.Produces;
import oracle.wtg.core.OdiInstance;
import oracle.wtg.domain.topology.OdiDataServer;
import oracle.wtg.em.info.DataServerInfo;
@Path(path ="/dataserver")
public class DataServer
{
  @GET
  @Produces("application/json,application/json")
  @Path(path = "/dataserverinfos")
  public DataServerInfo[ ] getAllCustomers(@QueryParam("string") String
iString)
  {
    DataServerInfo[ ] outValue;
    outValue =
oracle.code.em.service.DataServerService.getAllDataServerInfos(iOdiInstance0)( );
    return outValue;
  }
```

Figure 4:
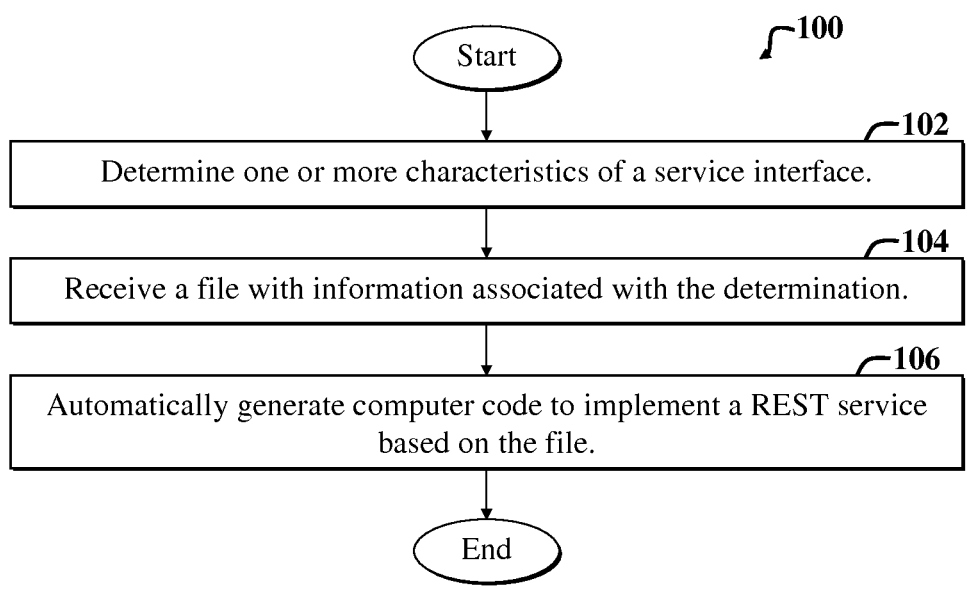
FIG. 4 is a flow diagram of an example method adapted for use with the embodiments of FIGS. 1-3.

FIG. 4 is a flow diagram of an example method 100 adapted for use with the embodiments of FIGS. 1-3. The example method 102 include a first step 102, which involves determining one or more characteristics of a service interface, such as the service interface 22 of FIG. 1.

With reference to FIGS. 1 and 4, a second step 104 includes receiving a file, e.g., an XML file, with information associated with the determining. The XML file may be provided via the developer system 20 of FIG. 1.

A third step 106 includes automatically generating computer code to implement a Representational State Transfer (REST) service based on the file. The computer code may be automatically generated by the code generator 16 of FIG. 1 in accordance with the process 80 of FIG. 4.

Note that method 100 may be augmented or otherwise changed, without departing from the scope of the present teachings. For example, the method 100 may further include employing a code generator that receives the XML file as output from the REST analysis tool 26 of FIG. 1 to automatically generate the computer code, i.e., classes, that together comprise the REST service 30.

In certain implementations, a web service that is part of the service project 28 includes one or more resources that are mapped to the REST service 30 via the code generator 16.

The example method 100 may further include employing the code generator 16 to create a dump file that contains one or more programming language classes that comprise the generated computer code. The code generator 16 may employ a name annotations modifier to facilitate processing a class specified in a package received by the code generator 16.

The method may further include employing the code generator 16 to process each method of the class of the package to produce one or more updated methods in response thereto. The updated methods are updated to conform to restrictions or constraints necessitated by characteristics of the service interface 22.

The example method 100 may further include deploying one or more programming language classes (e.g., Java classes) on a Java platform (e.g., as represented by the Java runtime system 24 of FIG. 1) via a Jersey REST container (e.g., the container 18 of FIG. 1). The Java classes may be part of a dump file output by the code generator 16 and represented by the REST service 30, and which contains computer code for all generated Java REST resource files. All service dependencies are incorporated into the jump file.

The method 100 may further include employing computer code (e.g., the code generator 16) implemented via a Java® archive, which is responsive to receipt of a GET HTTP method and/or a POST method from the developer system 20, to trigger running of the code generator 16.

Although the description has been described with respect to particular embodiments thereof, these particular embodiments are merely illustrative, and not restrictive. For example, while certain embodiments discuss automatic generation of Jersey REST services, embodiments are not limited thereto. For example, Apache CXF™ RestEasy, or WildFly implementations are possible.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating development of a web service, the method comprising:
    obtaining information for implementing requisite changes to names indicated in a package, wherein the names are associated with web resources, and wherein the names are associated with classes;
    processing each name using a name annotations modifier;
    determining one or more service interface characteristics of a service interface, wherein the one or more service interface characteristics include one or more service interface class attributes and service interface method data, and wherein each of the one or more service interface class attributes includes one or more of a name and a modifier type;
    generating a file that contains a mapping, wherein the mapping maps one or more of the web resources to a representational state transfer (REST) service by mapping the one or more service interface class attributes and service interface method data with one or more REST service class attributes and REST service method data, and wherein each of the one or more service REST service class attributes includes one or more of a name and a modifier type; and
    generating computer code to implement the REST service based on the mapping, wherein the generating of the computer code comprises:
        employing a code generator to create a dump file that contains one or more programming language classes that comprise the generated computer code for generated Java REST resource files;
        employing the name annotations modifier to facilitate processing a class specified in a package received by the code generator; and
        processing each method of the class specified in the package to produce one or more updated methods in response to data updated in accordance with the service interface.

2. The method of claim 1, wherein the file is an extensible markup language (XML) file, and wherein the XML file represents an output of a REST analysis tool applied to the service interface.

3. The method of claim 1, wherein the file is an extensible markup language (XML) file, and wherein the web service includes one or more resources that have been mapped to a REST service via the generating of the computer code, and wherein the one or more resources includes the web resources.

4. The method of claim 1, wherein the generating of the computer code is performed by the code generator.

5. The method of claim 1, wherein the generating of the computer code comprises creating the dump file that contains one or more programming language classes that comprise the generated computer code.

6. The method of claim 1, wherein the generating of the computer code comprises:
    employing a code generator to create the dump file that contains one or more programming language classes that comprise the generated computer code; and
    employing the name annotations modifier to facilitate processing a class specified in the package, wherein the package is received by the code generator.

7. The method of claim 1, wherein the generating of the computer code comprises creating the dump file that contains one or more programming language classes, and wherein one or more programming language classes are adapted to be deployed on a Java(R) platform via a Jersey REST container.

8. The method of claim 1, wherein the generating of the computer code comprises creating the dump file that contains one or more programming language classes, and wherein the dump file comprises computer code for generated Java REST resource files.

9. The method of claim 1, wherein the generating of the computer code comprises employing computer code implemented via a Java(R) archive.

10. The method of claim 1, wherein the generating of the computer code comprises employing computer code implemented via a Java(R) archive, and wherein the computer code is included in an application programming interface (API).

11. The method of claim 1, wherein the generating of the computer code comprises employing computer code that comprises a programming language class that is adapted to provide information for processing each class of a package pertaining to a web service to be implemented.

12. The method of claim 1, wherein the generating of the computer code comprises employing computer code that comprises a programming language class that is adapted to provide information for processing each class of a package pertaining to a web service to be implemented, and wherein the processing of each class includes processing each method of each class of the package to facilitate creating the dump file with computer code sufficient to implement the REST service.

13. The method of claim 1, wherein the generating of the computer code comprises:

employing computer code implemented via a Java(R) archive; and receiving a command to trigger running of the computer code.

14. The method of claim 1, wherein the generating of the computer code comprises:
employing computer code implemented via a Java(R) archive; and
receiving a command to trigger running of the computer code, wherein the command includes a GET hypertext transfer protocol (HTTP) method.

15. The method of claim 1, wherein the generating of the computer code comprises:
employing computer code implemented via a Java(R) archive; and
receiving a command to trigger running of the computer code, wherein the command includes a POST hypertext transfer protocol (HTTP) method.

16. The method of claim 1, wherein the generating of the computer code comprises:
employing computer code implemented via a Java(R) archive; and
importing all service dependencies for incorporation into the dump file.

17. An apparatus comprising:
a digital processor coupled to a display and to a computer-readable storage device, wherein the computer-readable storage device includes one or more instructions executable by the digital processor to perform operations comprising:
obtaining information for implementing requisite changes to names indicated in a package, wherein the names are associated with web resources, and wherein the names are associated with classes;
processing each name using a name annotations modifier;
determining one or more service interface characteristics of a service interface, wherein the one or more service interface characteristics include one or more service interface class attributes and service interface method data, and wherein each of the one or more service interface class attributes includes one or more of a name and a modifier type;
generating a file that contains a mapping, wherein the mapping maps one or more of the web resources to a representational state transfer (REST) service by mapping the one or more service interface class attributes and service interface method data with one or more REST service class attributes and REST service method data, and wherein each of the one or more service REST service class attributes includes one or more of a name and a modifier type; and
generating computer code to implement the REST service based on the mapping, wherein the generating of the computer code comprises:
employing a code generator to create a dump file that contains one or more programming language classes that comprise the generated computer code for generated Java REST resource files;
employing the name annotations modifier to facilitate processing a class specified in a package received by the code generator; and
processing each method of the class specified in the package to produce one or more updated methods in response to data updated in accordance with the service interface.

18. A non-transitory computer-readable storage device including instructions executable by a digital processor, the computer-readable storage device including one or more instructions for:
obtaining information for implementing requisite changes to names indicated in a package, wherein the names are associated with web resources, and wherein the names are associated with classes;
processing each name using a name annotations modifier;
determining one or more service interface characteristics of a service interface, wherein the one or more service interface characteristics include one or more service interface class attributes and service interface method data, and wherein each of the one or more service interface class attributes includes one or more of a name and a modifier type;
generating a file that contains a mapping, wherein the mapping maps one or more of the web resources to a representational state transfer (REST) service by mapping the one or more service interface class attributes and service interface method data with one or more REST service class attributes and REST service method data, and wherein each of the one or more service REST service class attributes includes one or more of a name and a modifier type; and
generating computer code to implement the REST service based on the mapping, wherein the generating of the computer code comprises:
employing a code generator to create a dump file that contains one or more programming language classes that comprise the generated computer code for generated Java REST resource files;
employing the name annotations modifier to facilitate processing a class specified in a package received by the code generator; and
processing each method of the class specified in the package to produce one or more updated methods in response to data updated in accordance with the service interface.

* * * * *

UNITED STATES PATENT AND TRADEMARK OFFICE
CERTIFICATE OF CORRECTION

PATENT NO. : 9,916,137 B2
APPLICATION NO. : 14/315248
DATED : March 13, 2018
INVENTOR(S) : Chouhan Page 1 of 1

It is certified that error appears in the above-identified patent and that said Letters Patent is hereby corrected as shown below:

In the Drawings

On sheet 1 of 4, in FIG. 1, under Reference Numeral 18, Line 2, delete "(Servelet" and insert -- (Servlet --, therefor.

In the Specification

In Column 10, Line 47, delete "CXF™" and insert -- CXF$^{(TM)}$, --, therefor.

In the Claims

In Column 12, Line 13, in Claim 3, delete "and-wherein" and insert -- wherein --, therefor.

Signed and Sealed this
Twenty-ninth Day of December, 2020

Andrei Iancu
*Director of the United States Patent and Trademark Office*